US010773685B2

(12) United States Patent
Dudekula et al.

(10) Patent No.: US 10,773,685 B2
(45) Date of Patent: Sep. 15, 2020

(54) IMPLEMENTING INFORMATION EXCHANGE ACROSS IOT ENABLED VEHICULAR DEVICES FOR AMPLIFIED DYNAMIC SECURITY

(71) Applicant: International Business Machines Corporation, Armonk, NY (US)

(72) Inventors: Rizwan Dudekula, Bangalore (IN); Gandhi Sivakumar, Bentleigh (AU); Kushal Patel, Pune (IN); Sarvesh Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/252,596

(22) Filed: Jan. 19, 2019

(65) Prior Publication Data
US 2020/0231121 A1 Jul. 23, 2020

(51) Int. Cl.
*B60R 25/00* (2013.01)
*B60R 25/102* (2013.01)
(Continued)

(52) U.S. Cl.
CPC .......... *B60R 25/102* (2013.01); *B60R 25/104* (2013.01); *B60R 25/30* (2013.01);
(Continued)

(58) Field of Classification Search
CPC ..... B60R 25/102; B60R 25/104; B60R 25/30; H04W 12/0503; H04W 84/18; H04W 84/042
(Continued)

(56) References Cited

U.S. PATENT DOCUMENTS 4,919,563 A 4/1990 Stice
6,823,317 B1 11/2004 Ouimet et al.
(Continued)

FOREIGN PATENT DOCUMENTS

CN 1885365 B 5/2010
CN 102184577 A 9/2011

OTHER PUBLICATIONS

Sakhil P George et al., Social Internet of Vehicles, International Research Journal of Engineering and Technology, vol. 04, Issue 04, Apr. 2017, pp. 712-716 https://www.irjet.net/archives/V4/i4/IRJET-V4I4142.pdf.
(Continued)

*Primary Examiner* — Ojiako K Nwugo
(74) *Attorney, Agent, or Firm* — Jay Wahlquist

(57) ABSTRACT

A method, system and computer program product are provided for implementing 5G network-based information exchange across Internet of Things (IoT) enabled vehicular devices for amplified dynamic security. A 5G enabled amplified security manager is provided to implement enhanced amplified dynamic security for parked vehicles. The 5G enabled amplified security manager is provided with each enabled parked vehicle providing a 5G ad-hoc network. Information is dynamically collected and exchanged between the 5G enabled amplified security managers. When abnormal behavior is detected based on analysis of the collected data, the abnormal behavior information is sent on the 5G ad-hoc network triggering protective actions in co-ordination with all the devices in the network and provides security amplification.

20 Claims, 6 Drawing Sheets

(51) Int. Cl.
   *H04W 12/00* (2009.01)
   *B60R 25/104* (2013.01)
   *B60R 25/30* (2013.01)
   *B60R 25/10* (2013.01)
   *H04W 84/18* (2009.01)
   *H04W 84/04* (2009.01)

(52) U.S. Cl.
   CPC ............. *H04W 12/00503* (2019.01); *B60R 2025/1016* (2013.01); *H04W 84/042* (2013.01); *H04W 84/18* (2013.01)

(58) Field of Classification Search
   USPC ....................................................... 340/426.2
   See application file for complete search history.

(56) References Cited

U.S. PATENT DOCUMENTS

| | | | |
|---|---|---|---|
| 7,119,674 | B2 | 10/2006 | Sefton |
| 8,769,610 | B1* | 7/2014 | Giguiere ............. H04L 63/20 726/1 |
| 8,818,725 | B2 | 8/2014 | Ricci |
| 2005/0132024 | A1 | 6/2005 | Habaguchi et al. |
| 2007/0184852 | A1* | 8/2007 | Johnson ............... H04W 64/00 455/456.1 |
| 2009/0125713 | A1* | 5/2009 | Karschnia ............ H04W 12/04 713/153 |
| 2010/0060485 | A1* | 3/2010 | Kim ..................... G08G 1/143 340/932.2 |
| 2010/0331023 | A1 | 12/2010 | Cai et al. |
| 2014/0046582 | A1* | 2/2014 | Tijink .................. G01C 21/30 701/412 |
| 2015/0028996 | A1* | 1/2015 | Agrafioti ............. G06F 21/32 340/5.82 |
| 2015/0130641 | A1* | 5/2015 | Rahman ............... G08G 1/142 340/932.2 |
| 2015/0266389 | A1* | 9/2015 | Appelbaum ............ B60L 3/04 320/138 |
| 2016/0117866 | A1 | 4/2016 | Stancato et al. |
| 2017/0066406 | A1 | 3/2017 | Ricci |
| 2018/0077518 | A1* | 3/2018 | Nguyen ............ G08G 1/096791 |
| 2019/0051183 | A1* | 2/2019 | Anderson ............. H04W 4/80 |
| 2020/0128072 | A1* | 4/2020 | Trim ..................... H04L 67/12 |

OTHER PUBLICATIONS

Taimur Khan et al. Certificate revocation in vehicular ad hoc networks techniques and protocols: a survey, Science China Information Sciences, Oct. 2017, vol. 60. 10.1007/s11432-017-9203-x. https://www.researchgate.net/publication/318941832_Certificate_Revocation_in_Vehicular_Ad_hoc_Networks_Techniques_and_Protocols_A_Survey.

Garcia et al., "Vehicle Detection Based on Laser Radar," Computer Aided Systems Theory—EUROCAST 2009, 12th International Conference, Feb. 15-20, 2009, pp. 391-397.

* cited by examiner

VEHICLE IoT DEVICE
AMPLIFIED
SECURITY
MANAGER (ASM)
102

SERVICE ORCHESTATION,
ADVANCED FEED BACK
262

| BOUNDARY EXTRACTOR 264 | SPEECH TO TEXT 266 |
| --- | --- |
| MAP BASED CLASSIFIER 268 | BOUNDARY MAP COORDINATE IDENTIFIER 270 |
| INFORMATION DELIVERY SEARCH (LAST MILE OR HEAD END) 272 | LOCATION BASED CLASSIFIER 274 |
| VEHICLE ORIENTED DATA CLASSIFIER, ANOMALY DETECTOR 276 | DEVICE TYPE IDENTIFIER 278 |
| CHANNEL IDENTIFIER & NOTIFIER 280 | DYNAMIC ACTUATOR MANAGER 282 |
| AUTO-DELIVERY MANAGER 284 | INTERNET METADATA MAP COMPARE 286 |
| INCIDENT CYCLE MANAGER 288 | AD-HOC NETWORK MANAGER 290 |

FIG. 2B

US 10,773,685 B2

IMPLEMENTING INFORMATION EXCHANGE ACROSS IOT ENABLED VEHICULAR DEVICES FOR AMPLIFIED DYNAMIC SECURITY

FIELD OF THE INVENTION

The present invention relates generally to the data processing field, and more particularly, relates to a method, system and computer program product for implementing 5G network-based information exchange across Internet of Things (IoT) enabled vehicular devices for amplified dynamic security.

DESCRIPTION OF THE RELATED ART

Currently, there is no way that information can be collected using the resources of parked vehicles. No mechanism exists for the transferring information to the cars using 5G ad-hoc networking capabilities to provide amplified vehicular security of parked vehicles. Also, there is no such mechanism which can be used in 5G orchestration to determine when security is violated nor that uses an ad-hoc network of the devices for parked vehicles.

As used in the following description and claims, the term "5G network" is not limited to 5th generation cellular mobile communications or 5th generation wireless systems and should be understood to broadly include other existing and future cellular mobile communications and wireless systems having a service orchestration layer, ad-hoc networking capabilities, high data rate, large system capacity, and large device connectivity.

SUMMARY OF THE INVENTION

Principal aspects of the present invention are to provide a method, system and computer program product for implementing 5G network-based information exchange across Internet of Things (IoT) enabled vehicular devices for amplified dynamic security. Other important aspects of the present invention are to provide such method, system and computer program product substantially without negative effects and that overcome many of the disadvantages of prior art arrangements.

In brief, a method, system and computer program product are provided for implementing 5G network-based information exchange across Internet of Things (IoT) enabled vehicular devices for amplified dynamic security. A 5G enabled amplified security manager is provided to implement enhanced amplified dynamic security for parked vehicles. The 5G enabled amplified security manager is provided with each enabled parked vehicle providing a 5G ad-hoc network. Information is dynamically collected and exchanged between the 5G enabled amplified security managers. When abnormal behavior is detected based on analysis of the collected data, the abnormal behavior information is sent on the 5G ad-hoc network triggering protective actions.

In accordance with features of the invention, the 5G ad-hoc network includes IoT surrounding devices and the 5G ad-hoc network triggering protective actions include actuating IoT surrounding devices, such as closing a barricade to a parking area.

In accordance with features of the invention, the 5G ad-hoc network triggering protective actions includes sounding alarms, notifying owners and notifying predefined authority, such as parking management.

In accordance with features of the invention, providing the 5G ad-hoc network includes dynamically updating the 5G ad-hoc network based on changes in the enabled parked vehicles.

In accordance with features of the invention, collected information is analyzed in a service orchestration of 5G network and insights are articulated on the ad-hoc 5G network.

In accordance with features of the invention, the selective information transfer across the dynamic ad-hoc networked devices enables deeper information about situation, security breach and other related circumstances.

In accordance with features of the invention, enhanced capability for more secured parking is provided utilizing the 5G ad-hoc networks and cognition enabled platforms, providing amplified dynamic security with integration of IoT enabled devices In accordance with features of the invention, multiple vehicles parked in parallel possessing the 5G capabilities, they collectively form an ad-hoc network and exchanges the information. Once the devices are identified, orchestration layer issues the data collection instructions to the devices in the defined boundary for information exchange across entities and creates an ad-hoc network of the devices present in the boundary area. Upon initiating the data collection and ad-hoc network establishment, the cognition enabled platform detects suspicious behavior, such as someone trying to remove the car wheel, or an unknown person trying to get inside car.

In accordance with features of the invention, when abnormal behavior is detected then the information is broadcasted in the ad-hoc network containing all the surrounding IoT enabled vehicular devices and other IoT enabled devices such as building doors, exit barricades and the like, which then takes the respective protective action. Actions to be taken are dependent of the type of devices, such as all the cars will start alarming, barricades will be down which will resist a car from exiting, and optionally doors are locked to prevent a car from exiting.

BRIEF DESCRIPTION OF THE DRAWINGS

The present invention together with the above and other objects and advantages may best be understood from the following detailed description of the preferred embodiments of the invention illustrated in the drawings, wherein:

FIG. 2B illustrates an example vehicle IoT device Amplified Security Manager (ASM) to implement enhanced amplified dynamic security for parked vehicles in the 5G system of FIG. 1 in accordance with preferred embodiments;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized, and structural changes may be made without departing from the scope of the invention.

The terminology used herein is for the purpose of describing embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and system are provided for implementing enhanced amplified dynamic security for parked vehicles. A 5G network includes 5th generation wireless systems or 5th generation of cellular mobile communications, and other cellular mobile communications and wireless systems enabling information exchange across Internet of Things (IoT) enabled vehicular devices for amplified dynamic security, for example, including a service orchestration layer, dynamic ad-hoc vehicle to vehicle (V2V) network, security breach detection, and IoT enabled interconnect.

In accordance with features of the invention, the 5G enabled amplified security manager (ASM) is provided with each enabled parked vehicle forming a 5G ad-hoc network. Information is dynamically collected and exchanged between the 5G enabled amplified security managers including IoT surrounding devices. When abnormal behavior is detected based on analysis of the collected data, the abnormal behavior information is sent on the 5G ad-hoc network triggering protective actions.

Figure 1:
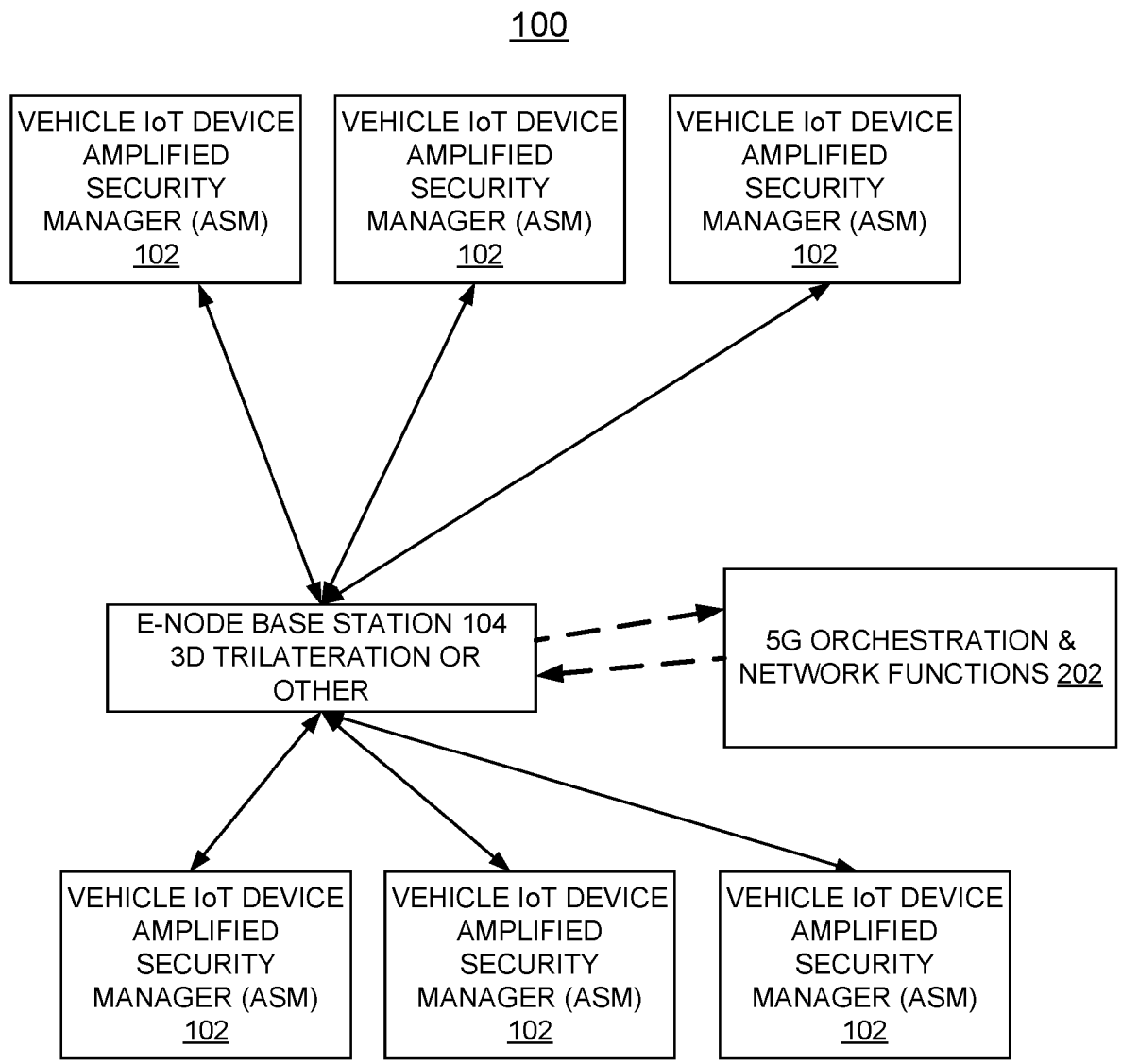
FIG. 1 is a block diagram of an example 5G system for implementing enhanced amplified dynamic security for parked vehicles in accordance with preferred embodiments.
Figure 2A:
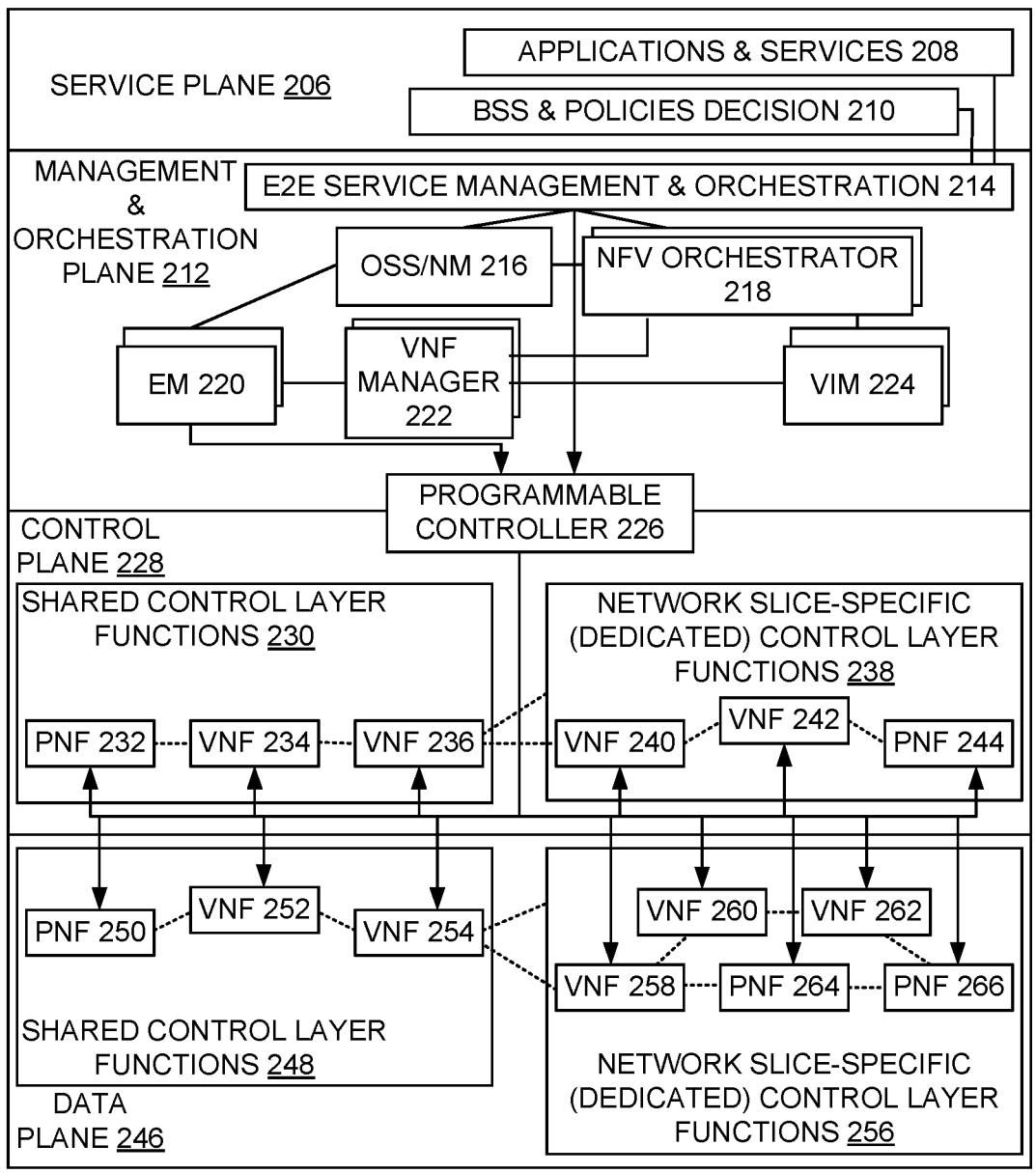
FIG. 2A illustrates example 5G orchestration and network functions to implement enhanced amplified dynamic security for parked vehicles in the 5G system of FIG. 1 in accordance with preferred embodiments.
Figure 3:
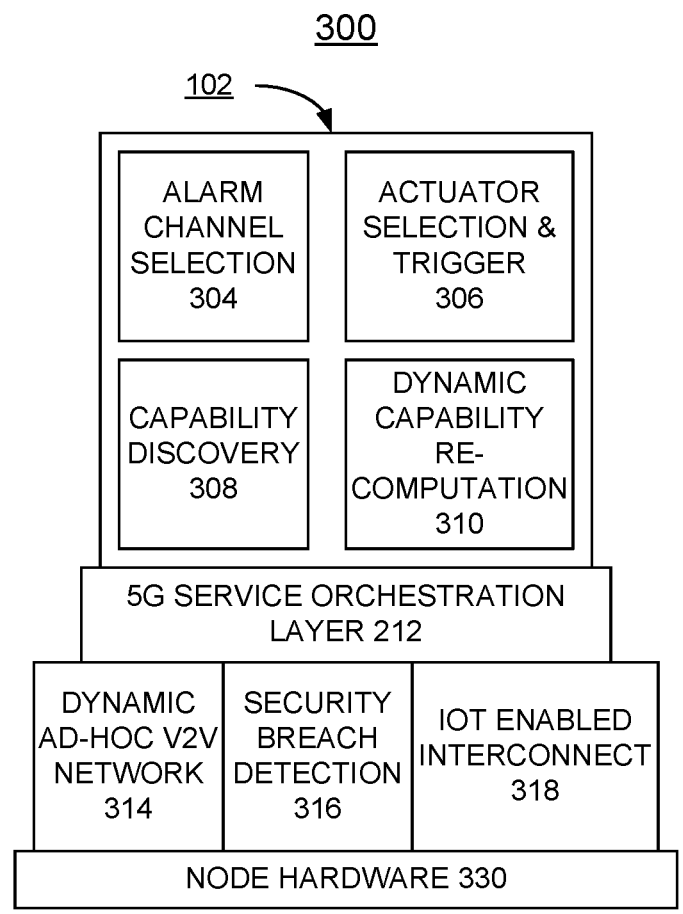
FIG. 3 illustrates an example functions of a vehicle IoT device Amplified Security Manager (ASM) carried by a 5G service orchestration layer with example 5G network functions in accordance with preferred embodiments.

Having reference now to the drawings, in FIG. 1, there is shown an example 5G network system embodying the present invention generally designated by the reference character 100 for implementing enhanced amplified dynamic security for parked vehicles in accordance with preferred embodiments. 5G network system 100 includes a plurality of vehicles with Internet of Things (IoT) enabled vehicular device for amplified security manager (ASM) 102, each coupled by a 5G E-node base station 104 to 5G orchestration and network functions 202, for example, as illustrated and described with respect to FIGS. 2A, 2B, and 3.

Referring also to FIG. 2A, there are shown example 5G orchestration and network functions generally designated by the reference character 200 to implement enhanced amplified dynamic security for parked vehicles in the 5G system 100 in accordance with preferred embodiments. 5G orchestration and network functions apparatus 202 includes a service plane 206 including applications and services 208 and business and support systems (BSS) and policies decision 210.

5G orchestration and network functions apparatus 202 includes a management and orchestration plane 212 including end to end (E2E) service management and orchestration 214, operational support system and network manager (OSS/NM) 216, NFV orchestration 218, EM 200, virtual network function (VNF) manager 222, virtualized infrastructure manager (VIM) 224, each coupled to a programmable controller 226.

5G orchestration and network functions apparatus 202 includes a control plane 228 including a shared control layer functions 230 including a physical network function (PNF) 232, multiple virtual network functions (VNFs) 234, 236. Control plane 228 includes a network slice-specific (dedicated) control layer functions 238 including multiple virtual network functions (VNFs) 240, 242 and a physical network function (PNF) 244.

5G orchestration and network functions apparatus 202 includes a data plane 246. The data plane 246 includes shared control layer functions 248 including a physical network function (PNF) 250, multiple virtual network functions (VNFs) 252, 2254. Data plane 246 includes a network slice-specific (dedicated) control layer functions 256 including multiple virtual network functions (VNFs) 258, 260, 262, 264 and physical network functions (PNFs) 264, 266.

Referring also to FIG. 2B, there is shown example an example vehicle IoT device Amplified Security Manager (ASM) 102 to implement enhanced amplified dynamic security for parked vehicles in the 5G system 100 in accordance with preferred embodiments. Vehicle IoT device Amplified Security Manager (ASM) 102 provides service orchestration with advanced feedback functions 262 including boundary extractor 264, speech to text 266, map based classifier 268, boundary map coordinate identifier 270, information delivery search (last mile or head end) 272, location based classifier 274, vehicle oriented data classifier, anomaly detector 276, device type identified 278, channel identifier and notifier 280, dynamic actuator manager 282, auto-delivery manager 284, Internet Metadata map compare 286, incident cycle manager 288, and ad-hoc network manager 290.

Referring also to FIG. 3, there are shown example functions generally designated by the reference character 300 of a vehicle IoT device Amplified Security Manager (ASM) 102. The vehicle IoT device ASM 102 carried by a 5G service orchestration layer 212 enabling features of the invention. Example 5G network functions include a dynamic ad-hoc vehicle to vehicle network 314, security breach detection 316, and IoT enabled interconnect 318 with each node hardware 320 in accordance with preferred embodiments.

Figure 4:
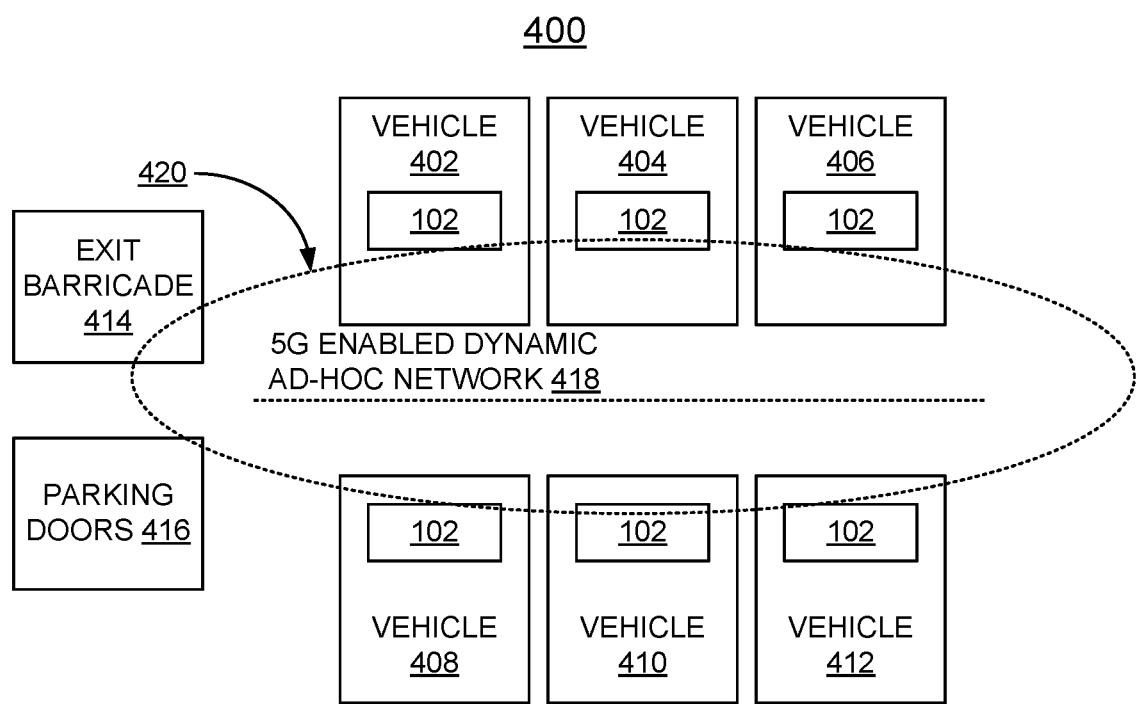
FIG. 4 illustrates and example G network with multiple example vehicle IoT device Amplified Security Manager (ASM) and parking area example features each with an IoT device Amplified Security Manager (ASM) in accordance with preferred embodiments.

Referring also to FIG. 4, there is shown example apparatus generally designated by the reference character 400 in accordance with preferred embodiments. Apparatus 400 includes an example 5G network 402 generally indicated by 404 connected with parking area example features including and IoT enabled exit barricade 406 and parking doors 408. Each of multiple example vehicles 410, 412, 414, 416, 418 and 420 include IoT device Amplified Security Manager (ASM) 102 provided with the dynamic ad-hoc vehicle to vehicle network 402.

In accordance with features of the invention, the 5G enabled amplified security manager (ASM) 102 leverages the data collected from the IoT enabled devices placed on vehicles to its framework. The collected information is analyzed in the 5G service orchestration layer 212 included with network functions 202 and insights are articulated on a dynamic ad-hoc vehicle to vehicle network, such as network 402. The 5G enabled amplified security manager (ASM) 102 creates, restructures and updates the dynamic ad-hoc network 402 of the IoT enabled vehicles parked in the defined boundary area along with the peripheral devices 406, 408. For example, when a car 418 is moved out from the parking are then the dynamic ad-hoc network 204 removes this vehicle node 418 from the list and updates the records accordingly. The 5G enabled amplified security manager (ASM) 102 integrates the IoT enabled surrounding devices, such as a barricade 406, parking doors 408, and the like, to collect the information and to work associated actuators when a security breach detected.

In accordance with features of the invention, the 5G enabled amplified security manager (ASM) 102 classifies information collected using hierarchical or parallel classifier and anomaly detector 276 along with location-based classifier 274 and in-scope boundary definition, for example, situation valid for vehicle or set of vehicles using the boundary map coordinate identifier 270. For example, ASM 102 uses boundary sensitive classification module trained for the circumstances like oil spill, suspicious behaviors, unauthorized access of vehicle, and the like. The 5G ASM 102 locates the vehicles, creates ad-hoc network of the vehicles and transfers selective information across the dynamic ad-hoc networked devices to provide enhanced information about situation, security breach and other related circumstances.

In accordance with features of the invention, the 5G ASM 102 identifies suspicious movements by identifying unknown numbers closer to the vicinity through a familiar number map, such as map based classifier 268. For example, the 5G apparatus 202 captures and builds a table with mobile numbers, such as for the family members or friends, such as associated with the following Table 1, capability discovery database.

When the 5G apparatus 202 and ASM 102 identifies closer unknown mobile numbers or vehicles when at parking mode, the near field tracking is turned on. When the 5G apparatus 202 and ASM 102 identifies a pattern of movement using near fields, such as the unknown number or numbers near or around the vehicle, an attempt to tamper can be identified. Also, a suspect pattern can be input from external sources and compared to a current pattern and a breach triggers all the alert channels. The 5G apparatus 202 and ASM 102 selects the method of actions for the breach and ASM 102 provides the method of action for the IoT enable devices when a breach is detected. Communication with the owner is enabled in multiple possible ways, such as including a call to the owner in natural language in case a theft symptom is detected to the parked vehicle. Then communications with the all the devices 102 collectively are provided to overcome the security breach using all the ad-hoc network devices.

In accordance with features of the invention, the 5G apparatus 202 and ASM 102 monitors the cycle of an event, for example using the incident cycle manager 288 and communicates with the networked devices to change the states considering the situational context or in autonomous mode to auto switch context of the parked vehicles for defined boundaries in the boundary map coordinate identifier 270. The 5G apparatus 202 and ASM 102 identifies a possible affected set of vehicles, surrounded people and IoT devices, area affected, and relates them with control policies and uses charging rule functions to authenticate information and select the situational model, for example using the ad-hoc network manager 290 in the service orchestration, advanced feedback 262 of ASM 102. The 5G apparatus 202 and ASM 102 integrates and utilizes expression maps, phrases used, gesture, analyzes conversions of input media stream to shape the type of content and generates metadata accordingly, for example using internet metadata map compare 286.

In accordance with features of the invention, the 5G apparatus 202 and ASM 102 discover and collects capabilities from all the vehicles and IoT enabled devices, and stores a capability discovery database, such as illustrated in the following Table 1.

TABLE 1

Capability discovery database

| Car_UID_AD_hoc | Discovered_Capability_list_touple |
|---|---|
| Car_000001 | <Alarming, Call_home, SMS_alert> |
| Car_000002 | <Loud_Sound, Police_call, SMS_alert> |
| Car_000003 | <Alarming, Loud_Sound, Call_home, Police_call, SMS_alert, Call_family_friends> |
| Car_00000n | . . . |

For example, if Car_00001 in the 5G ad-hoc network 402 has capability to notify police station as it contains the vital material, when this car is being parked, then at this time, the present invention triggers recomputing and determines that there is at least one device (vehicle) which can connect to the police station and updates its records. The following Table 2 illustrates an example table maintained at each node instance in the 5G ad-hoc network 402.

TABLE 2

Table maintained at each instance of the node in Ad-hoc network

| Resource_Priority_Ordering | Car_UID_AD_hoc |
|---|---|
| Alarming | Car_000002 |
| Loud_Sound, | Car_000003 |
| Call_home, | Car_000009 |
| Police_call, | Car_000011 |
| SMS_alert, | Car_000014 |
| Call_family_friends | Car_000017 |
| . . . | Car_n |

In case any security breach is detected, then 5G apparatus 202 and ASM 102 has the information by which the details are communicated to the respective vehicle users and authorities based on the corresponding ordering of resource priorities.

Figure 5:
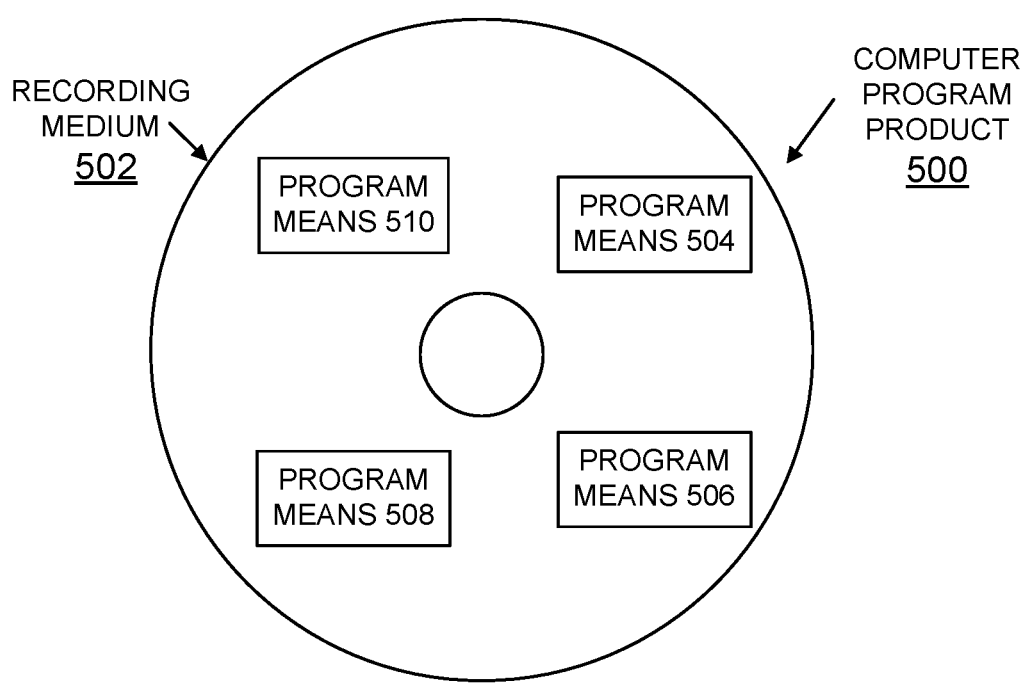
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. The computer readable storage medium 502, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Recording medium 502 stores program means or instructions 504, 506, 508, and 510 on the non-transitory computer readable storage medium 502 for carrying out the methods for implementing enhanced amplified dynamic security for parked vehicles in the system 100 of FIG. 1 and example apparatus of FIGS. 2A and 2B.

Computer readable program instructions 504, 506, 508, and 510 described herein can be downloaded to respective computing/processing devices from a computer readable storage medium or to an external computer or external storage device via a network, for example, the Internet, a local area network, a wide area network and/or a wireless network. The computer program product 500 may include cloud-based software residing as a cloud application, commonly referred to by the acronym (SaaS) Software as a Service. The network may comprise copper transmission cables, optical transmission fibers, wireless transmission, routers, firewalls, switches, gateway computers and/or edge servers. A network adapter card or network interface in each computing/processing device receives computer readable program instructions 504, 506, 508, and 510 from the network and forwards the computer readable program instructions for storage in a computer readable storage medium within the respective computing/processing device.

A sequence of program instructions or a logical assembly of one or more interrelated modules defined by the recorded program means 504, 506, 508, and 510, direct the system 100 for implementing enhanced amplified dynamic security for parked vehicles of the preferred embodiment.

While the present invention has been described with reference to the details of the embodiments of the invention shown in the drawing, these details are not intended to limit the scope of the invention as claimed in the appended claims.

What is claimed is:

1. A system for implementing enhanced amplified dynamic security for parked vehicles comprising:
   a 5G enabled amplified security manager (ASM) situated in service orchestration layer of a 5G network, one said 5G ASM provided with each enabled parked vehicle;
   said 5G ASM used to implement enhanced amplified dynamic security for parked vehicles comprising:
   forming a 5G ad-hoc network including each enabled parked vehicle;
   dynamically collecting and exchanging information between each 5G enabled ASM;
   detecting abnormal behavior based on analysis of the collected data; and
   sending the abnormal behavior information on the 5G ad-hoc network and triggering a protective action.

2. The system as recited in claim 1, wherein the service orchestration layer creates the 5G ad-hoc network of each said 5G ASM provided with the enabled parked vehicles present in a boundary area.

3. The system as recited in claim 2, wherein the 5G ad-hoc network includes Internet of Things (IoT) surrounding devices present in a boundary area.

4. The system as recited in claim 3, includes triggering a protective action on the IoT surrounding devices.

5. The system as recited in claim 1, wherein sending the abnormal behavior information on the 5G ad-hoc network and triggering a protective action includes at least one of sounding an alarm, notifying an owner and notifying predefined authority.

6. The system as recited in claim 2, includes dynamically updating the 5G ad-hoc network based on changes in the enabled parked vehicles.

7. The system as recited in claim 2, includes the service orchestration layer analyzing collected data enabling enhanced secured parking in the boundary area.

8. The system as recited in claim 2, includes a cognition enabled platform detecting suspicious behavior used for triggering the protective action.

9. The system as recited in claim 1, includes managing and performing predefined levels of monitoring of each IoT enabled parked vehicle.

10. The system as recited in claim 1, includes integrating IoT enabled surrounding devices including at least one of a barricade and parking door to collect information and to provide a predefined actuator action when triggering the protective action.

11. The system as recited in claim 1, includes control code stored on a non-transitory computer readable medium, and wherein said 5G ASM uses said control code to implement enhanced amplified dynamic security for parked vehicles.

12. A computer-implemented method for implementing enhanced amplified dynamic security for parked vehicles in a 5G enabled system using a 5G enabled amplified security manager (ASM) situated in service orchestration layer of a 5G network, one said 5G ASM provided with each enabled parked vehicle, said computer-implemented method comprising:
    forming a 5G ad-hoc network including each enabled parked vehicle;
    dynamically collecting and exchanging information between each 5G enabled ASM;
    detecting abnormal behavior based on analysis of the collected data; and
    sending the abnormal behavior information on the 5G ad-hoc network and triggering a protective action.

13. The computer-implemented method as recited in claim 12, includes in service orchestration layer creating the 5G ad-hoc network of each said 5G ASM provided with the enabled parked vehicles present in a boundary area.

14. The computer-implemented method as recited in claim 13, wherein the 5G ad-hoc network includes Internet of Things (IoT) surrounding devices present in a boundary area.

15. The computer-implemented method as recited in claim 14, includes triggering a protective action on the IoT surrounding devices.

16. The computer-implemented method as recited in claim 12, includes integrating Internet of Things (IoT) enabled surrounding devices including at least one of a barricade and parking door to collect information and to provide a predefined actuator action when triggering the protective action.

17. The computer-implemented method as recited in claim 14, includes dynamically updating the 5G ad-hoc network based on changes in the enabled parked vehicles in the boundary area.

18. The computer-implemented method as recited in claim 14, includes the service orchestration layer analyzing collected data enabling enhanced secured parking in the boundary area.

19. The computer-implemented method as recited in claim 12, includes a cognition enabled platform detecting suspicious behavior used for triggering the protective action.

20. The computer-implemented method as recited in claim 12, wherein sending the abnormal behavior information on the 5G ad-hoc network and triggering a protective action includes at least one of sounding an alarm, notifying an owner and notifying predefined authority.

* * * * *